United States Patent [19]

Mast

[11] 4,371,258

[45] Feb. 1, 1983

[54] ILLUMINATING DEVICE FOR PHOTOGRAPHIC COPYING APPARATUS

[75] Inventor: Fred Mast, Wil, Switzerland

[73] Assignee: Gretag Aktiengesellschaft, Regensdorf, Switzerland

[21] Appl. No.: 295,101

[22] Filed: Aug. 21, 1981

[30] Foreign Application Priority Data

Aug. 25, 1980 [CH] Switzerland .......................... 6387/80

[51] Int. Cl.³ ........................ G03B 27/54; G03B 27/72
[52] U.S. Cl. ...................................... 355/37; 350/96.1; 350/96.18; 355/1
[58] Field of Search ......................... 355/1, 37, 70, 71; 350/315, 96.15, 96.1, 96.18

[56] References Cited

U.S. PATENT DOCUMENTS

| | | | |
|---|---|---|---|
| 2,985,062 | 5/1961 | Clapp | 355/37 |
| 3,482,915 | 12/1969 | Corley | 355/37 |
| 3,492,070 | 1/1970 | Zahn | 355/37 |
| 3,514,200 | 5/1970 | Bowker | 355/1 |
| 3,897,147 | 7/1975 | Simon | 355/37 |
| 3,923,394 | 12/1975 | Frankiewicz | 355/37 |
| 3,950,093 | 4/1976 | Schneider | 355/37 |
| 4,125,315 | 11/1978 | Altman et al. | 355/1 X |
| 4,129,372 | 12/1978 | Allgeier | 355/1 |
| 4,188,111 | 2/1980 | Marvin | 355/1 X |

FOREIGN PATENT DOCUMENTS

2528673 1/1977 Fed. Rep. of Germany.

*Primary Examiner*—Richard A. Wintercorn
*Attorney, Agent, or Firm*—Burns, Doane, Swecker & Mathis

[57] ABSTRACT

An illuminating system has as main components: a light source comprising four low voltage lamps and, associated therewith, reflectors and condenser lenses, a filter unit, an image-producing pair of lenses, a deflecting mirror and light-mixing element made of glass. The condenser lenses produce images of the coils of the low voltage lamps in the central horizontal plane of the filter unit. Images of the condenser lenses are produced by the image-producing lens pair in a light entry face of the light-mixing element. This light entry face is provided with ribbings constituting cylindrical lenses of special dimensioning which effect homogenization of the light in the light-mixing element. In order to reduce light losses, the light-mixing element is composed of two frusto pyramidal element parts and has its smallest cross-sectional area in a middle region in which the smaller end faces of the frusto pyramidal parts are joined to an interposed diffusor disc. The filter unit comprises a pair of interference filters for each filter color. The filters of each pair can be driven by means of a stepping motor and cam disc to move symmetrically with regard to the optical axis. The illuminating device is of high light intensity and affords a particularly homogeneous light distribution.

17 Claims, 6 Drawing Figures

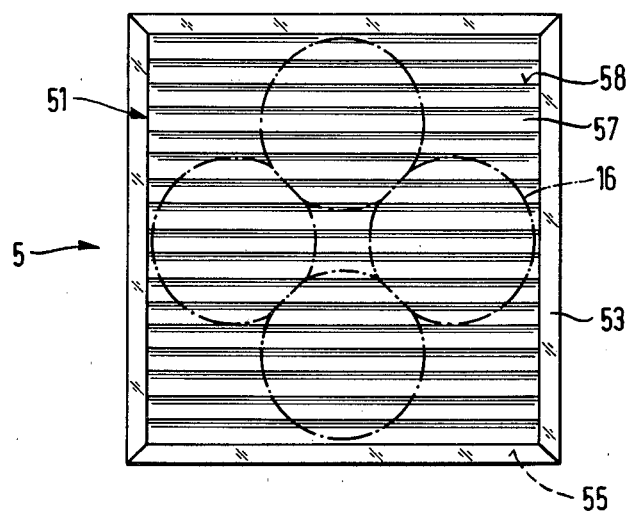
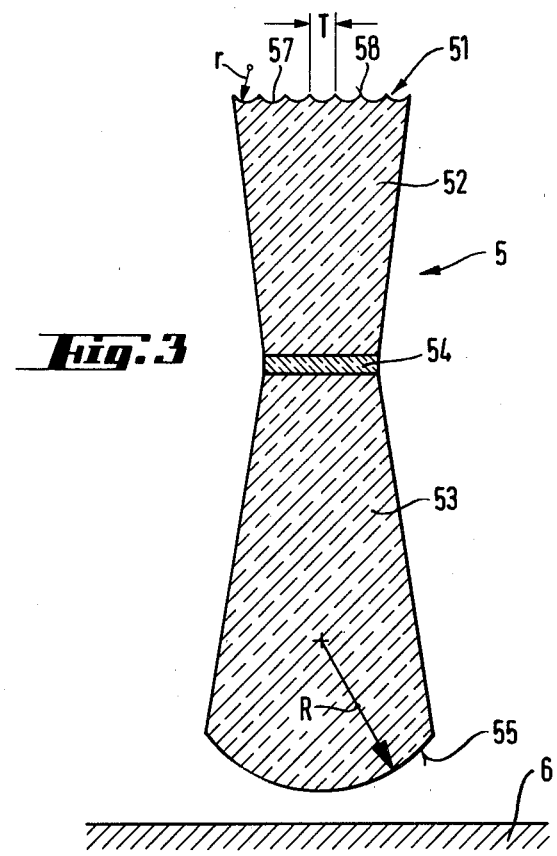

ILLUMINATING DEVICE FOR PHOTOGRAPHIC COPYING APPARATUS

BACKGROUND OF THE INVENTION

This invention relates to an illuminating device for photographic copying apparatus comprising a light source, an image-producing optical unit, a light-mixing element having a light entry face provided with parallel ribbings, and a filter unit interposed into the path of light rays from the light source to the light-mixing element, which filter unit comprises a window for the passage of light and serves for regulating the color composition of the light emitted by the light source. Such illuminating devices are used, for instance, in the Color Printer of Type No. 3140 manufactured by Gretag AG, Regensdorf, Switzerland and marketed in the United States by CX Corporation, Seattle, Wash.

With increasing efficiency of automatic copying apparatus, the demands made on the copying light and, together therewith on the illuminating device producing the same, are likewise rising all the time. In particular, increasingly higher light intensities are demanded in order to attain shorter exposure times and correspondingly higher copying speeds.

With increasing light intensities, the difficulties of achieving homogenization of the color distribution across the illuminated surface are likewise augmented. In particular it is difficult to obtain a uniform color distribution independently of the positioning of the filter. Furthermore it becomes necessary to pay increased attention to the degree of light efficiency with the aim of avoiding losses of light as much as possible.

OBJECTS AND SUMMARY OF THE INVENTION

The present invention has the object of providing an illuminating device of the initially described type which is capable of producing unobjectionally homogeneous light even at the highest light intensities, while causing only a minimum loss of light.

These demands are satisfied in accordance with the invention by an illuminating device of the initially described type, wherein the ribbings of the light entry face of the light-mixing element are cylindrical lenses arranged in parallel in a row, with every two adjacently located cylindrical lenses being joined with one another forming a sharp edge therebetween and wherein the cylindrical lenses are so dimensioned that the images of the window of the filter unit generated by neighboring cylinder lenses are located adjacent one another substantially free from interspaces therebetween and free from overlappings thereof.

Each cylinder lens is constituted by an axial, external or internal surface zone of a cylinder mantle.

These cylinder lenses can be concave, i.e. they can be constituted by grooves in the light entry face of the light-mixing element, or they can be convex, i.e. in the form of ridges or ribs vaulted upwardly out of the light entry face, without any substantial difference in the resulting light-mixing effect. Preferably, at least about ten and up to twenty cylinder lenses are arranged in parallel beside one another in a light entry surface having most preferably a bredth of about 40 mm, so that the width of each cylindrical lens taken transverse to the longitudinal cylinder zone axis, preferably ranges from 4 mm in the case of ten lenses to 2 mm in the case of twenty lenses.

The radii of curvature of the cylindrical lenses preferably satisfy the equation $r=(n-1)LT/B$ wherein n is the refractive index of the material of which the light-mixing element consists, L is the optical distance between the light entry face and the central plane through the filter unit, B is the width of the window for the passage of light and T the graduation of the ribbing of the light entry face, i.e. the width of each cylinder lens therein.

For reasons of easier manufacture, concave cylinder lenses are preferred. Thus, the cylindrical lenses could be impressed into the light entry face of the light-mixing element. The filter unit can have a pair of interference filters for each filter color, with the filters of each pair being symmetrically adjustable relative to the optical axis of the unit between two end positions one of which is nearest to, and the other farthest from, the optical axis. The longitudinal central axes of the lens cylinders preferably extend at a right angle to the projections, on to the light entry face, of the paths along which the two filters of each filter pair travel during their displacement toward or away from one another.

A light-dispersing element or diffuser can be arranged ahead of the light entry face of the light-mixing element, which diffusor can be provided at its light-entry or light-exit end with parallel serrations or ribbings preferably constituting cylindrical lenses, which cylindrical lenses are disposed substantially perpendicularly to the cylindrical lenses of the light entry face of the light-mixing element.

At its end, opposite to that bearing the cylindrical lenses, the diffusor can be provided with a spherical face which is so dimensioned that it enables formation of an image of the light-transmitting window of the filter unit essentially in the plane of support for the original to be copied, which is to be illuminated through the device according to the invention.

The light entry face of the light-mixing element can also be provided with a second row of cylindrical lenses disposed in parallel and each adjacent a neighboring lens or lenses, this second row being oriented at a right angle to the first row of cylindrical lenses in the light entry face.

Preferably, the cross sectional area of the light-mixing element decreases from each end face thereof toward a minimum cross-sectional area in a middle region intermediate both ends, and a diffusor plate can be interposed in that middle region between separate upper and lower portions of the element.

The region of minimum cross-sectional area is preferably about half the cross-sectional area of the light entry face of the light-mixing element; and it is preferred that the diffusor disc divides the length of the said element in a proportion of about 1:2, with the smaller portion of the element bearing the light entry face at its free end.

Terms such as "upper," "lower," "horizontal" and the like refer to the positions of the respective parts in the drawings unless expressly stated otherwise.

BRIEF DESCRIPTION OF THE DRAWINGS

Other objects attained, and further structural details of the illuminating device according to the invention will become apparent from the following description thereof in connection with the accompanying drawings in which

FIG. 2 is a top view of the light entry face of the light-mixing element of the embodiment shown in FIG. 1, along a plane indicated by II—II in the latter figure;

FIG. 3 is a view in axial section of the light-mixing element, in a plane indicated by III—III in FIG. 1;

DETAILED DESCRIPTION OF THE DRAWINGS

Figure 1:
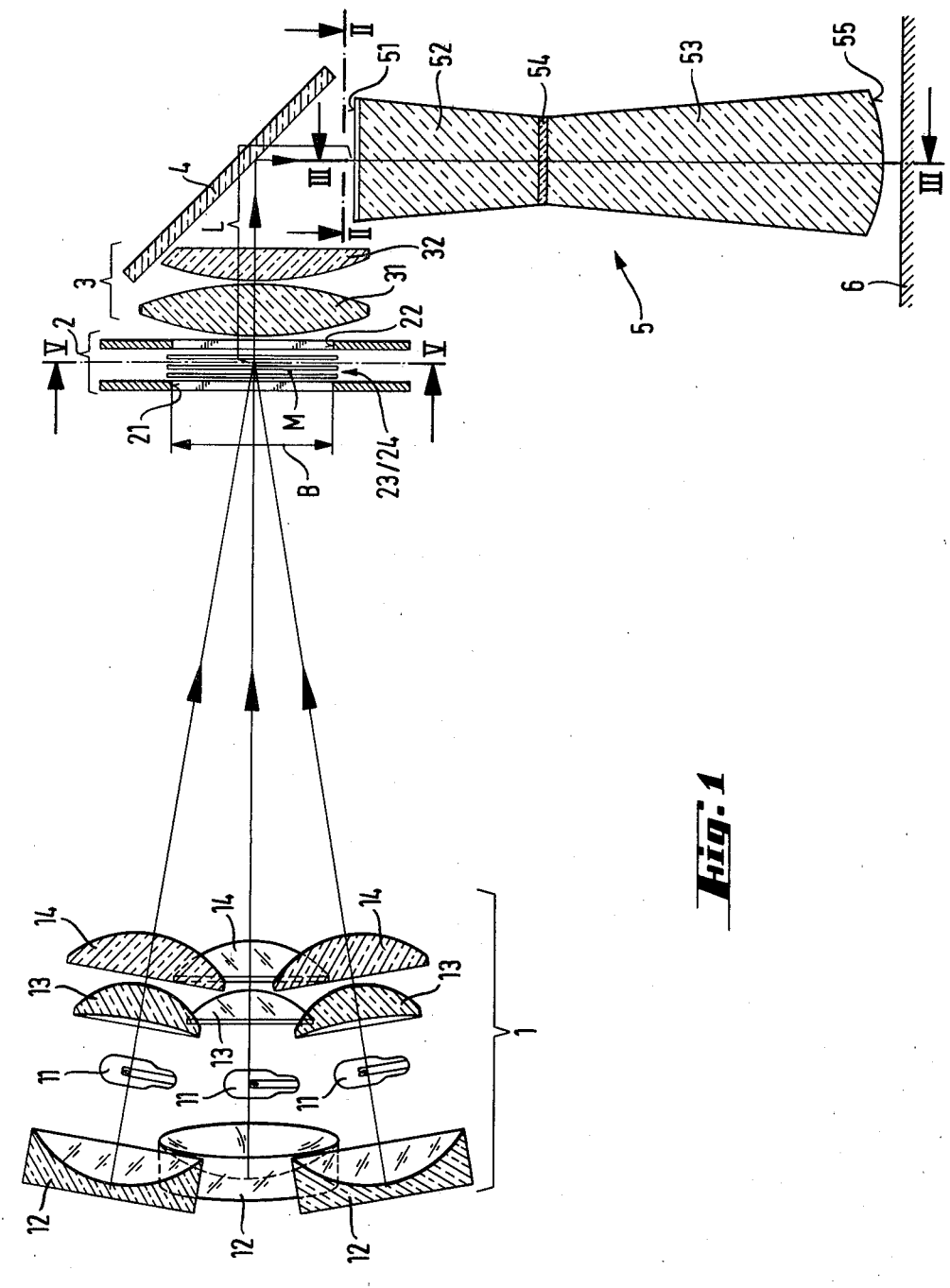
FIG. 1 is a schematic representation of a preferred embodiment of the illuminating device according to the invention.

The embodiment of the illuminating device according to the invention which is destined to be built into a photographic copying machine, comprises a light source designated as a whole by reference numeral 1, a filter unit 2, an image-producing optical unit 3 consisting of two lenses 31 and 32, a deflecting mirror 4 and a light-mixing element 5.

The light emitted by the light source 1 is modulated with regard to its intensity and color composition in the filter unit 2 and is deflected by the mirror 4 into the light-mixing element 5, from which it emerges in homogenized state and illuminates the support 6, indicated merely schematically, for an original to be copied, which can be, as a rule, a photographic negative picture.

In this general arrangement the illuminating device illustrated in the drawings corresponds to the known type of device which is used, for instance in the automatic Color Printer 3140 mentioned hereinbefore. Inventive features distinguishing the instant illuminating device from known structures comprise, in particular, a novel embodiment of the light-mixing element 5, the filter unit 2 and the light source 1 as well as their mutual spatial and optical arrangement.

The light source 1 consists of four lamp systems in symmetrical arrangement, each of which comprises a low voltage halogen lamp 11, a reflector 12 and two condenser lenses 13 and 14. Every two of these systems are arranged vertically one above the other, or horizontally one beside the other.

The reflectors 12 and condensor lenses 13 and 14 are arranged and dimensioned in a manner such that the filament coils of the lamps 11 as well as their mirror images are imaged in a common plane at least approximately in the central plane M of the filter unit 2 (indicated in FIG. 1). The size of the coil image 15 which is indicated by dashed lines in FIG. 5 corresponds substantially to the two light-transmitting windows 21 and 22 of the filter unit 2.

The two lenses 31 and 32 of the image-producing optical unit 3 produce images of the condenser lenses of the four systems of the light source 1 via the deflecting mirror 4 on the light entry face 51 of the light-mixing element 5. On this face 51, there is thus generated the condenser image 16 which is shown in phantom lines in FIG. 2.

The filter unit 2 comprises, for each of the three subtractive basic colors, essentially one pair of interference filters 23, 24 (FIG. 5) which filters are adjustable symmetrically relative to the optical axis of the illuminating system. Each one of these filter pairs can be driven by means of its own stepping motor (not shown) via a cam disc (not shown) in such a manner that the relative (color) intensity changes of the filtered light occur in unchanging steps. Further details of the structure of this filter unit are described, for instance, in U.S. Pat. No. 4,080,050.

The limiting edges, turned toward each other, of the two filters 23 and 24 of each pair are not straight but of concave configuration.

Figure 5:
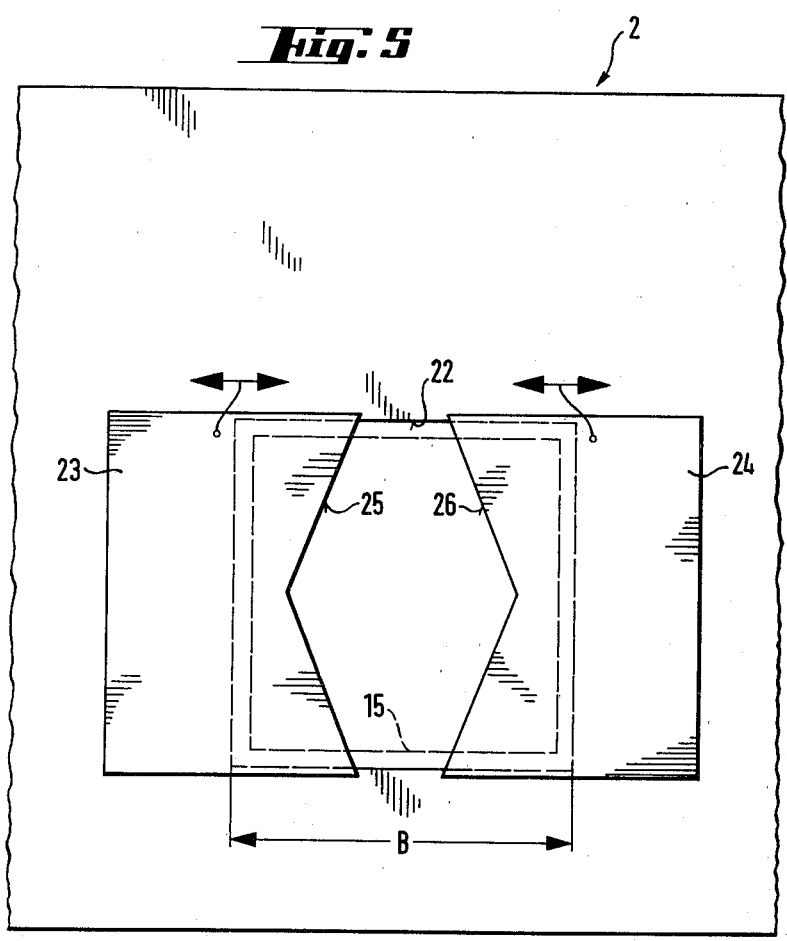
FIG. 5 is a schematic frontal view of the filter unit taken in a plane indicated by V—V in FIG. 1.

In FIG. 5, for example, the front edges 25 and 26 of these filters are each those of a wedge-shaped cutout. The concave front edges 25 and 26 afford better regulating characteristics at larger attenuation values, i.e. when the two filters of a pair are in positions nearer the optical axis.

In the embodiment shown in FIG. 1, the light-mixing element 5 consists of two frustopyramidal element parts 52 and 53 made from glass, and of a diffusor disc 54 interposed between these element parts. The light exit face 55 of the lower part 53 of the light-mixing element 5 is of spherical configuration. The light entry face 51 of the upper element part 52 is provided with a ribbing, wherein the longitudinal directions or axes along which the parallelly arranged ribs extend, run at a right angle to the projections, on to the light entry face 51, of the paths along which the filter pairs of the filter unit 2 are moved.

In FIG. 1 the filters of each of the three pairs shown are moved in a path vertical to the plane of the paper, so that, consequently, the ribbings run parallel to that plane.

Figure 4:
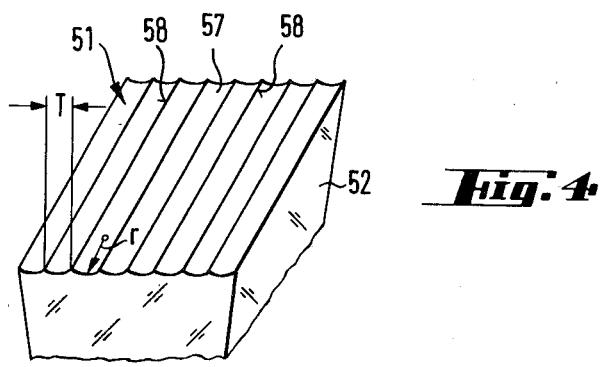
FIG. 4 is an enlarged view in perspective of the upper end portion bearing the light entry face, of the same light-mixing device.

FIGS. 3 and 4 show the exact configuration of the ribbed light entry face 51 of light-mixing element 5. The individual ribs or ridges and the grooves therebetween constitute a number of cylindrical lenses 57 which are arranged directly adjacently in a row, neighboring lenses being delimited against one another by straight edges 58 which are made as sharp as is technically feasible.

The radius of curvature of these cylindrical lenses 57 is designated by r, and the graduation of the ribbing, i.e. the width of the lens transversely to the longitudinal cylinder axis and taken from edge to edge 58 is designated by T. These cylindrical lenses are impressed directly into the glass material of the upper light-mixing element part 52.

It is the function of the impressed cylindrical lenses 57 to achieve the best practically attainable homogeneity of the light independently of the positions of the filter pairs in the filter unit 2. This requires a particular configuration and dimensioning of the cylindrical lenses 57. Optimal results are obtained with edges 58 between neighboring cylindrical lenses made as narrow and sharp as is technically possible with present glass-shaping techniques, e.g. by grinding, and with radii of curvature of the cylindrical lenses 57 which substantially satisfy the equation $$r = (n-1)\frac{LT}{B}$$

wherein n, L, T and B have the meanings given hereinbefore. More in particular, B is the length of one side of a square window 21 or 22 of the filter unit 2.

With these dimensions, the cylindrical lenses 57 are capable of forming the image of the light-passage window of the filter unit 2 in a common plane in such a manner that the individual images will border on each other without showing any seams or overlapping. The light-mixing element 5 then views a homogeneous light surface.

In the illustrated embodiment, B and L have the preferred values of 60 and about 100 mm, respectively. The ribbing graduation T is a free parameter. T is chosen as small as feasible which corresponds to a fine ribbing of the light entry face 51. A lower limit for T is given by the expense involved in impressing the cylindrical lens facets in the light entry face 51 of the light-mixing element 5. Favorable values which are technically and economically permissible are at a minimum number of about ten to twenty cylindrical lenses, or ribs, on the light entry face, as mentioned hereinbefore, resulting in the stated preferred values for T and in practical values for the radius of curvature of each lens, which range preferably from about 2.5 mm (for 20 ribs) and 5 mm (for ten ribs). The cylindrical lenses 57 in the illustrated embodiment are of concave configuration.

The lower light exit face 55 of the light-mixing element 5 preferably has a spherical curvature, in which case its radius of curvature R is so dimensioned that the lens surface constituted by the light exit face 55 produces an image of the ribbed light entry face 51 at least approximately at the entry pupil of the imaging objective (not shown) of the copying machine. Of course, the light exit face 55 could also be planar, in which case an additional lens would have to be provided to fulfill the function of the spherical face.

In the illustrated embodiment of FIGS. 1 and 5 the light-mixing element 5 is divided into an upper element part 52 and a lower part 53. Each of these parts 52 and 53 is of frustopyramidal configuration with the larger pyramid bases 51 and 55 of the two parts being at opposite ends of the light-mixing element 5, while the two smaller end faces of the frustopyramidal parts 51 and 52 are joined together by means of an interposed diffusor disc 54. The cross-sectional area of the element at the smaller end faces is about half of the cross-sectional area of the larger upper light entry face 51. The diffusor disc 54 preferably divides the element 5 in such a manner that the lengths of the lower element part 53 is about twice as big as the length of the upper element part 52, thus dividing the element 5 in a ratio of the lengths of the two parts being about 1:2.

With this configuration of the light-mixing element 5 and this arrangement of the diffusor disc 54, the light losses are kept at a minimum while an optimal light-mixing effect is achieved. Of course, the light-mixing element 5 could also have a different shape; thus, it could be shaped as a simple frustopyramidal body, or a prism, in which case the diffusor disc would be arranged at the lower light exit end, or the light exit face could itself be devised as a diffusor disc.

In the illustrated embodiment of the illuminating device according to the invention the coil image 15 is produced in the central plane M of the filter unit 2, and the condensor image 15 is projected on to the light entry face 51 of the light-mixing element 5. Naturally, the reverse arrangement would also be possible, so that the coil image would be projected on to the light entry face of the light-mixing element and the condenser image would be produced in the filter unit.

Moreover, it would, of course, be possible to turn the individual parts about the optical axis by an angle of 45° between them whereby, for instance, the four corners of the condenser image 16 in FIG. 2 would coincide with the corners of the square light entry face 51 of the light-mixing element 5.

Figure 6:
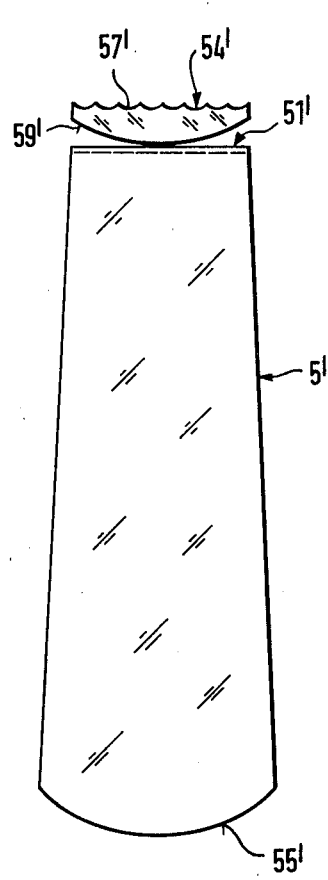
FIG. 6 is a side view of another embodiment of the light-mixing element usable in the illuminating device shown in FIG. 1.

In FIG. 6, there is shown another embodiment of the light-mixing element which has the advantage of causing particularly low loss of light. The light-mixing element 5' has no constricted middle region, but is substantially of frustopyramidal shape. The light exit face 55' and the light entry face 51' are, however, of similar configuration as in the embodiment of FIGS. 1 to 4.

Instead of the diffusor disc, a separate diffusor element 54' is provided immediately in front of the light entry face 51' of the light-mixing element 5'. This diffusor element 54' consists of normal transparent glass and bears on its top face a ribbing 57' which is similar to that of the light entry face 51, while its opposite side 59' which rests on the light entry face 51' of light-mixing element 5' has the configuration of a spherical segment or calotte. The axes of the ribbings, or cylindrical lenses 57', extend vertically to those of the cylindrical lenses 57 which are provided in the light entry face. What has been disclosed hereinbefore with regard to the dimensioning of the cylindrical lenses 57 of the light entry face 51 applies analogously to the cylindrical lenses 57'. The spherical face 59 is so dimensioned that it produces an image of the light passage window 21, 22 of the filter unit 2 at least approximately in the plane of the support 6 for a photographic negative.

In lieu of the spherical face 59', the diffusor element 54' could also have a lower end face which is planar. Moreover, the cylindrical lenses 57' could also be provided on the lower end face 59' and they could be of convex configuration.

In the embodiment of the light-mixing element illustrated in FIG. 6, the cylindrical lenses 57 in the diffusor element 57 could also extend at a right angle to the projections of the paths along which the filters of each filter pair can be displaced, rather than have cylindrical lenses 57 do so in the light entry face 51. Furthermore, the two rows of cylindrical lenses 57 and 57' could also be arranged in a single plane, in which case, of course, no separate diffusor element would be needed. In this case, the two rows of cylindrical lenses, extending vertically to one another, would constitute an embossment or relief of a cross vaulting type in the light entry face 51. This relief could also be replaced by a raster of spherical lenses.

I claim:

1. In an illuminating device for photographic copying apparatus comprising a light source, an image-producing optical unit, a light-mixing element having a light entry face provided with parallel ribbings, and a filter unit interposed into the path of light rays from the light source to the light-mixing element, which filter unit comprises a window for the passage of light and serves for regulating the color composition of the light emitted by the light source, the improvement of said ribbings of the light entry face of the light-mixing element being cylindrical lenses arranged in parallel in a row, with every two adjacently located cylindrical lenses being joined with one another forming a sharp edge therebetween and wherein the cylindrical lenses are so dimensioned that the images of the window of the filter unit generated by neighboring cylinder lenses are located adjacent one another substantially free from interspaces therebetween and free from overlappings thereof.

2. The improvement of claim 1, wherein at least about ten and up to twenty cylinder lenses are arranged in parallel beside one another in said light entry surface.

3. The improvement of claim 2, wherein the width of each cylindrical lens taken transverse to the longitudinal axis of such lens ranges from 4 mm in the case of ten lenses to 2 mm in the case of twenty lenses.

4. The improvement of claim 1, 2 or 3, wherein the radii of curvature of the cylindrical lenses satisfy the equation $$r = (n - 1)\frac{LT}{B}$$

wherein n is the refractive index of the material of which the light-mixing element consists, L is the optical distance between said light entry face and a central plane through said filter unit, B is the width of said window for the passage of light and T is the graduation of the ribbing of the light entry face.

5. The improvement of claim 1, wherein each of said cylinder lenses is of concave configuration.

6. The improvement of claim 1, wherein said cylindrical lenses are impressed into the light entry face of the light-mixing element.

7. The improvement of claim 1, wherein said filter unit comprises a pair of interference filters for each filter color, with the filters of each pair being symmetrically adjustable relative to the optical axis of the unit between two end positions one of which is nearest to, and the other farthest from, the optical axis, and wherein the longitudinal central axes of the cylindrical lenses extend at a right angle to the projections, on to the light entry face, of the paths along which the two filters of each filter pair travel during their displacement relative to one another.

8. The improvement of claim 1, further comprising a light-dispersing diffusor arranged ahead of the light entry face of said light-mixing element, which diffusor bears at one of its light-entry end and light-exit end parallel ribbings constituting cylindrical lenses, which cylindrical lenses are disposed substantially perpendicularly to the cylindrical lenses of said light entry face of said light-mixing element.

9. The improvement of claim 8, wherein said diffusor comprises, at its end opposite to that bearing said cylindrical lenses, a spherical face which is so dimensioned as to enable formation of an image of said window of said filter unit essentially in the plane of a support for the original to be copied in the copying apparatus.

10. The improvement of claim 1, wherein said light entry face of said light-mixing element comprises a second row of cylindrical lenses disposed in parallel and each adjacent a neighboring lens or lenses, this second row being oriented at a right angle to the first-mentioned cylindrical lenses in said light entry face.

11. The improvement of claim 1, wherein said light-mixing element comprises an upper and a lower element part; wherein the cross-sectional area of the light-mixing element decreases from each end face thereof toward a minimum cross-sectional area in a middle region intermediate both end faces, and wherein said light-mixing element comprises a diffusor disc interposed in said middle region between said upper and lower element parts.

12. The improvement of claim 11, wherein the size of said region of minimum cross-sectional area is about half the size of the cross-sectional area of said light entry face of the light-mixing element.

13. The improvement of claim 11 or 12, wherein said diffusor disc divides the length of said light-mixing element in a proportion of about 1:2, with the smaller element part bearing said light entry face.

14. The improvement of claim 1, wherein said light source comprises at least one lamp system consisting of a low voltage lamp having a filament coil, a reflector and condenser lens means, and wherein said image-producing optical unit is so arranged that it produces an image of said coil in the central plane of said filter unit and that it produces an image of said condenser lens means in said light entry face of said light-mixing element.

15. The improvement of claim 14, wherein said light source comprises from two to six lamp systems which are arranged symmetrically to the optical axis of said filter unit.

16. The improvement of claim 15, wherein said light source comprises four such lamp systems.

17. The improvement of claim 7, wherein each of the two filters of each such pair of interference filters, has a lateral limiting edge facing toward the limiting edge of the other filter of the same pair, each of these lateral limiting edges being concave.

* * * * *